3,226,427
CARBAMATE THIOSULFONATES
Joseph E. Dunbar, Midland, Mich., assignor to The Dow Chemical Company, Midland, Mich., a corporation of Delaware
No Drawing. Filed Oct. 28, 1963, Ser. No. 319,553
6 Claims. (Cl. 260—471)

The present invention is directed to carbamate thiosulfonates corresponding to the formula

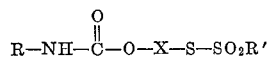

In this and succeeding formulae, R and R' each independently represent a member of the group consisting of lower alkyl, phenyl, lower alkylphenyl, halophenyl and lower alkylhalophenyl and X is selected from the group consisting of methylene, ethylene, and trimethylene. In the present specification and claims, the expression "lower alkyl" is employed to designate an alkyl group containing up to and including 6 carbon atoms. Under ordinary conditions these compounds are crystalline solids which are somewhat soluble in many common organic solvents and of low solubility in water. The compounds are useful as pesticides and are adapted to be employed as toxicants for the control of a number of insects, fish, bacterial and fungal organisms, such as roaches, potato and tomato late blight, *Aspergillus terreus, Pullularia pullulans* and *Rhizopus nigricans*.

The novel carbamate thiosulfonates of the present invention are prepared by reacting an O-halo-alkyl carbamate corresponding to the formula:

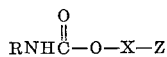

where Z represents halogen, with an alkali metal salt of a thiosulfonic acid corresponding to the formula:

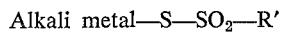

The reaction conveniently is carried out in an organic liquid as reaction medium such as dimethylformamide, ethanol, methanol, propanol, nitromehtane, acetone, aqueous acetone, aqueous ethanol, sulfolane and dioxane. The amounts of the reagents to be employed and reaction conditions are not critical, some of the desired product being obtained at once when employing any proportion of the reactants. However, the reactions consume the reactants in equimolar proportions and the use of amounts which represent such proportions is preferred.

Representative materials to be employed are 2-iodoethyl-N-hexylcarbamate, 2 - bromoethyl-N-(pentamethylphenyl)carbamate, 2 - bromoethyl N - (3,4,6 - tribromophenyl)carbamate, 3-iodopropyl N-2,4,6-triethylphenyl) carbamate, 2-bromoethyl N-butyl carbamate, 3-bromopropyl N - (3,5 - dibromo-6-methylphenyl)carbamate, 2-bromoethyl N-(3,4,5-triethylphenyl)carbamate, sodium 3,5-dimethyl - 4 - bromobenzenethiosulfonate, sodium 4-iodobenzenethiosulfonate, potassium tert.-butanethiosulfonate, sodium 2,4,5-trichlorobenzenehtiosulfonate, potassium 3,4,5-tribromobenzenethiosulfonate, potassium 2,6 - dimethyl-4-chlorobenzenethiosulfonate, sodium 3-ethyl-5-iodobenzenethiosulfonate. The reaction takes place smoothly at temperatures at which the halide of reaction is formed and conveniently at temperatures of from 30° to 120° C. In a preferred procedure the reaction is carried out at temperatures between 55 and 100° C. The halide of reaction appears in the reaction mixture as alkali metal halide salt.

In carrying out the reaction, the reactants are mixed and contacted together in any convenient fashion and the resulting mixture maintained in the reaction temperature range for a period of time to insure completion of the reaction. Following the reaction, the reaction mixture is processed by conventional procedures to obtain the desired product in the desired form. In a convenient procedure, the halide of reaction is removed by filtration and the filtrate cooled by any suitable means to facilitate the separation of the desired product as an oil or a crystalline solid product. This product may be employed in pesticidal compositions or further purified by conventional procedures such as washing and crystallization from a common organic solvent.

The following examples merely illustrate the invention and are not to be construed as limiting.

*Example 1.—Ethylene methanethiosulfonate n-phenylcarbamate*

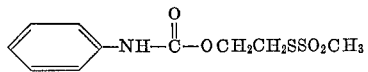

2-bromoethyl N-phenylcarbamate (7.33 grams; 0.0300 mole) and potassium methanethiosulfonate (4.51 grams; 0.0300 mole) were dispersed in 20 milliliters of dimethylformamide and the resulting mixture heated with stirring for 40 minutes at a temperature of 95° C. Following the heating period, the reaction mixture was cooled to room temperature, filtered, and the filtrate diluted with ice water. During the dilution, the reaction mixture separated into an aqueous layer and an organic layer. The organic layer was allowed to stand in contact with the diluted mixture for several hours, at room temperature, during which time the organic layer solidified. This solid material was recrystallized from ethanol to yield the ethylene methanethiosulfonate N-phenylcarbamate product as white crystals. The recrystallized product melted at 58–59° C. and had carbon, hydrogen and nitrogen contents of 44.07, 4.89 and 5.05 percent, respectively, as compared with theoretical contents of 43.62, 4.76, and 5.09 percent.

*Eample 2.—Ethylene N-phenyl carbamate p-toluenethiosulfonate*

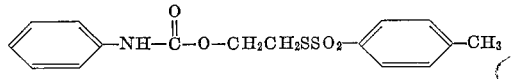

2-bromoethyl N-phenylcarbamate (24.4 grams; 0.100 mole) and potassium p-toluenethiosulfonate (22.6 grams; 0.100 mole) were dispersed in 20 milliliters of dimethylformamide. The resulting mixture was heated for 45 minutes with stirring at a temperature of 95° C. and thereafter allowed to cool to room temperature. The cooled mixture was filtered to remove potassium bromide and the filtrate diluted with ice water. During the dilution, the reaction mixture divided into an aqueous and an organic layer. The organic layer was allowed to stand in contact with the diluted mixture for three hours during which time the organic layer crystallized to yield the ethylene N-phenylcarbamate p-toluenethiosulfonate product, which was then recrystallized from ethanol. The white recrystallized product melted at 85° to 87° C., and had carbon, hydrogen and nitrogen contents of 54.52, 4.90, and 3.84 percent, respectively, as compared with theoretical contents of 54.68, 4.88 and 3.99 percent.

*Example 3.—ethylene p-bromobenzenethiosulfonate N-phenylcarbamate*

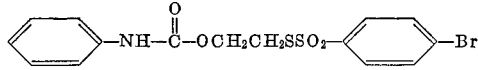

2-bromoethyl N-phenylcarbamate (19.0 grams; 0.0778 mole) and potassium p-bromobenzenethiosulfonate (22.7 grams; 0.0778 mole) were dispersed in 20 milliliters of dimethylformamide and the resulting mixture heated with stirring at a temperature of 95° C. for 45 minutes. Thereafter, the reaction mixture was cooled to room temperature, filtered and the filtrate diluted with ice water. The diluted mixture divided into an aqueous layer and an organic layer. The organic layer was treated as set forth in Example 2 to yield the ethylene p-bromobenzenethiosulfonate N-phenylcarbamate product as a white crystalline solid. The recrystallized product melted at 97.5° to 100° C. and had carbon, hydrogen and nitrogen contents of 43.38, 3.23 and 3.13 percent, respectively, as compared to theoretical contents of 43.27, 3.39 and 3.37 percent.

*Example 4.—Ethylene N-methylcarbamate methanethiosulfonate*

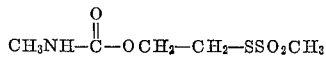

2-bromoethyl N-methylcarbamate (10.7 grams; 0.0588 mole) and potassium methanethiosulfonate (8.80 grams; 0.0588 mole) were dispersed in 20 milliliters of dimethylformamide and the resulting mixture heated with stirring for one hour at a temperature of 95° C. The reaction mixture was cooled to room temperature, filtered, and the filtrate diluted with ice water. The resulting aqueous solution was extracted with chloroform, the extract dried over anhydrous magnesium sulfate and the solvent removed from the dried extract by evaporation under reduced pressure leaving ethylene N-methylcarbamate methanethiosulfonate product as a liquid residue. This liquid residue was crystallized from petroleum ether and recrystallized from isopropanol. The white recrystallized product melted at 70°–72° C. and had carbon and hydrogen contents of 28.35 and 5.41 percent, respectively, as compared with theoretical contents of 28.16 and 5.20.

In a similar manner the following novel compounds of the present invention can be prepared.

Trimethylene 3-methyl - 5 - chlorobenzenethiosulfonate N-(3,5-dibromophenyl)carbamate (molecular weight of 548) by reacting together 3-bromopropyl N-(3,5-dibromophenyl) carbamate and potassium (3-methyl-5-chlorobenzene)thiosulfonate.

Ethylene pentachlorobenzenethiosulfonate N - (pentachlorophenyl)carbamate (molecular weight of 672) by reacting together 2-bromoethyl N-(pentachlorophenyl) carbamate and potassium pentachlorobenzenethiosulfonate.

Trimethylene methanethiosulfonate N-phenylcarbamate (white crystals melting at 58° to 60° C. and having carbon, hydrogen and nitrogen contents of 45.90, 5.42 and 4.76 percent, respectively, as compared with theoretical contents of 45.66, 5.23 and 4.84) by reacting together 3-bromopropyl N-phenylcarbamate and potassium methanethiosulfonate.

Ethylene N-hexylcarbamate hexanethiosulfonate (molecular weight of 344) by reacting together 2-iodoethyl N-hexylcarbamate and potassium hexylthiosulfonate.

Ethylene butanethiosulfonate N - (2,4,6-tribromophenyl)carbamate (white crystals melting at 52°–54° C. and having carbon, hydrogen and nitrogen contents of 49.15, 6.16 and 4.33 percent, respectively, as compared with theoretical contents of 49.19, 6.03 and 4.41) by reacting together 2-bromoethyl N - (2,4,6-tribromophenyl)carbamate and potassium butanethiosulfonate.

Ethylene benzenethiosulfonate N - phenylcarbamate (white crystals melting at 60.5° to 62.5° C. and having carbon, hydrogen and nitrogen contents of 53.40, 4.53 and 4.08 percent, respectively, as compared with theoretical contents of 53.39, 4.48 and 4.15 percent) by reacting together 2-bromoethyl N-phenylcarbamate and potassium benzenethiosulfonate.

Trimethylene (3,5-dibromo-6-methylbenzene)thiosulfonate N-(2,5-dichlorophenyl)carbamate (molecular weight of 395) by reacting together 3-bromopropyl N-(2,5-dichlorophenyl)carbamate and sodium 3,5-dibromo-6-methylbenzenethiosulfonate.

Ethylene (3-iodobenzene)thiosulfonate N-(pentamethylphenyl)carbamate (molecular weight 523) by reacting together 2 - iodoethyl N-(pentamethylphenyl)carbamate and potassium 3-iodobenzenethiosulfonate.

Trimethylene (2,6 - dibromobenzene)thiosulfonate N-(3,5-dimethyl - 4 - bromophenyl)carbamate (molecular weight of 607) by reacting together potassium 2,6-dibromobenzenethiosulfonate and 3-bromopropyl N-(3,5-dimethyl-4-bromophenyl)carbamate.

Ethylene [2-chloro - 5 - (2-methylpentyl)phenyl]-thiosulfonate N - (p - pentylphenyl)carbamate (molecular weight of 518) by reacting together 2-bromoethyl N-(p-pentylphenyl) carbamate and sodium 2-chloro-5-(2-methylpentyl)benzenethiosulfonate.

The compounds of the present invention or the compositions containing the same can be applied to pests and their habitates and foods in parasiticidal amounts to obtain excellent controls and kills of many organisms. The compounds may be included in inks, adhesives, soaps, cutting oils, high energy fuels or oil or latex paints to prevent mold and mildew, and the degradation of such products resulting from microbiological attack. Additionally, the compounds can be used as the toxic constituent in compositions for the control of the blight diseases of various plants.

The compound conveniently can be employed in liquid or dust formulations. In such usage, the compounds are modified with one or a plurality of adjuvants of helpers including water, organic solvents, petroleum oils, petroleum distillates, or other liquid carriers, surface active dispersing agents and finely divided solids such as chalk, talc or bentonite. Depending upon the concentration of the parasiticide compounds in such formulations, the augmented compositions are adapted to be distributed on plants or plant parts, or in soil, adhesives, cutting oils, high energy fuels, and paints to be employed as concentrates and subsequently diluted with additional liquid or solid adjuvants to produce the ultimate treating compositions.

The exact concentration of the substituted carbamate thiosulfonates to be employed in the treating composition is not critical and may vary considerably provided the required amount of effective agent is supplied on the plant or plant parts or in the soil, ink, adhesive, cutting oil, high energy fuel and so forth. The concentration of toxicant in liquid compositions generally is from 1 to 50 percent by weight, concentrations up to 95 percent by weight are conveniently employed. In dusts, the concentration of the toxicant can be from about 1 to 10 percent by weight. In compositions to be employed as concentrates, the toxicant can be present in a concentration of from 5 to 98 percent by weight.

In representative operations 100 percent kill of lake emerald shiner was obtained when ethylene N-methylcarbamate methanethiosulfonate was employed at concentrations of 2 parts per million by volume. In other representative operations excellent kill and control of tomato late blight, was obtained with aqueous compositions ocntaining one of the following compounds at a concentration of 300 parts per million by weight; ethylene methanethiosulfonate N-phenyl carbamate, trimethylene methanethiosulfonate N-phenylcarbamate, ethylene butanethiosulfonate N-phenylcarbamate and ethylene N-phenylcarbamate p-toluenethiosulfonate. In further operations trimethylene methanethiosulfonate N-phenylcarbamate gave excellent control and kill of *Aspergillus terreus*, *Pullularia pullulans*, and *Rhizopus nigricans* at concentrations of 500 parts per million by weight.

The thiosulfonates employed as starting materials in accordance with the teachings of the present invention can be prepared by known methods. In one method, potassium hydrosulfide (KSH) is reacted with a suitable lower alkane, benzene, lower alkylbenzene, halobenzene or alkyl-halobenzene sulfonyl halide, wherein halide represents chloride or bromide. Representative halides include butanesulfonyl chloride, isopropanesulfonyl chloride, 3-propyl-5-bromobenzenesulfonyl bromide, 2,3-dimethylbutylbenzenesulfonyl bromide and 2-chloro-5-isopropylbenzenesulfonyl chloride. In a convenient procedure, the reaction is carried out by adding the sulfonyl halide to an aqueous or alcoholic solution of potassium hydroxide saturated with $H_2S$. Upon completion of the reaction, the desired starting materials are separated by conventional procedures.

The O-haloalkyl carbamates as herein employed are also prepared by known methods. In such procedures, a 2-hydroxy-1-haloalkane such as 2 - hydroxy - 1 - bromoethane, 3-hydroxy-1-bromopropane, or 3-hydroxy-1-iodopropane are reacted with a suitable isocyanate (RNCO). Representative R-isocyanates include: ethyl isocyanate, 2,4,6-tri-ethylphenyl isocyanate, 2 - methyl-5-butylphenyl isocyanate, 3,4,5-trimethylphenyl isocyanate, 4-iodophenyl isocyanate, 5-bromophenyl isocyanate and 3,5-dibromophenyl isocyanate.

I claim:
1. A compound corresponding to the formula

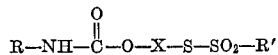

wherein R and R' each, independently, represent a member of the group consisting of lower alkyl, phenyl, lower alkylphenyl, halophenyl, and lower alkyl halophenyl and X is selected from the group consisting of methylene, ethylene and trimethylene wherein halo represents a member of the group consisting of chlorine, bromine and iodine.

2. Ethylene methanethiosulfonate N-phenylcarbamate.
3. Trimethylene methanethiosulfonate N-phenyl carbamate.
4. Ethylene N-phenylcarbamate p-toluenethiosulfonate.
5. Ethylene N-methylcarbamate methanethiosulfonate.
6. Ethylene benzenethiosulfonate N-phenylcarbamate.

References Cited by the Examiner
FOREIGN PATENTS
599,692   7/1934   Germany.

LEON ZITVER, *Primary Examiner.*
DANIEL D. HORWITZ, *Examiner.*